(12) United States Patent
Nachenberg et al.

(10) Patent No.: US 7,337,471 B2
(45) Date of Patent: Feb. 26, 2008

(54) SELECTIVE DETECTION OF MALICIOUS COMPUTER CODE

(75) Inventors: Carey Nachenberg, Northridge, CA (US); Peter Szor, Santa Monica, CA (US)

(73) Assignee: SYMANTEC Corporation, Cupertino, CA (US)

( * ) Notice: Subject to any disclaimer, the term of this patent is extended or adjusted under 35 U.S.C. 154(b) by 898 days.

(21) Appl. No.: 10/266,365

(22) Filed: Oct. 7, 2002

(65) Prior Publication Data

US 2004/0068664 A1    Apr. 8, 2004

(51) Int. Cl.
*G06F 11/00* (2006.01)
(52) U.S. Cl. ............... 726/23; 726/24; 713/188; 713/194; 709/223; 709/224
(58) Field of Classification Search ............... 713/188, 713/194; 726/22–25; 709/223–224; 707/4, 707/10
See application file for complete search history.

(56) References Cited

U.S. PATENT DOCUMENTS

| | | | |
|---|---|---|---|
| 5,398,196 A | 3/1995 | Chambers | |
| 5,452,442 A | 9/1995 | Kephart | |
| 5,495,607 A | 2/1996 | Pisello et al. | |
| 5,572,590 A | 11/1996 | Chess | |
| 5,613,002 A * | 3/1997 | Kephart et al. | ............... 726/24 |
| 5,675,710 A | 10/1997 | Lewis | |
| 5,694,569 A | 12/1997 | Fischer | |
| 5,826,249 A | 10/1998 | Skeirik | |
| 5,832,208 A | 11/1998 | Chen et al. | |
| 5,832,527 A | 11/1998 | Kawaguchi | |
| 5,854,916 A | 12/1998 | Nachenberg | |
| 5,884,033 A | 3/1999 | Duvall et al. | |
| 5,944,821 A * | 8/1999 | Angelo | ............... 726/22 |
| 5,974,549 A | 10/1999 | Golan | |
| 6,006,242 A | 12/1999 | Poole et al. | |
| 6,021,510 A | 2/2000 | Nachenberg | |
| 6,023,723 A | 2/2000 | McCormick et al. | |

(Continued)

FOREIGN PATENT DOCUMENTS

EP    0636977 A2    2/1995

(Continued)

OTHER PUBLICATIONS

Morar, J. E. and Chess, D. M., "Can Cryptography Prevent Computer Viruses?", Virus Belletin Conference 2000, pp. 127-138, Virus Bulletin Ltd., Oxfordshire, England.

(Continued)

*Primary Examiner*—T. B. Truong
(74) *Attorney, Agent, or Firm*—Fenwick & West LLP

(57) ABSTRACT

System, methods, and computer readable media for determining whether a computer file (340) has been infected by an attacking agent. A scanning engine (205) generates a new hash of a critical viral target region of the file (340) and compares it to a stored hash of the critical viral target region. The scanning engine (205) determines whether the file (340) has been scanned by the most recent version of a detection module (425) associated with the attacking agent. If the hashes are identical and the file (340) has been scanned by the most recent version of the detection module (425), the scanning engine (205) determines that the file (340) is free of infection by the attacking agent.

20 Claims, 5 Drawing Sheets

U.S. PATENT DOCUMENTS

| | | | |
|---|---|---|---|
| 6,052,709 A | 4/2000 | Paul | |
| 6,072,942 A | 6/2000 | Stockwell et al. | |
| 6,088,803 A | 7/2000 | Tso et al. | |
| 6,092,194 A | 7/2000 | Touboul | |
| 6,094,731 A | 7/2000 | Waldin et al. | |
| 6,125,459 A | 9/2000 | Andoh et al. | |
| 6,161,130 A | 12/2000 | Horvitz et al. | |
| 6,253,169 B1 | 6/2001 | Apte et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,721,721 B1 | 4/2004 | Bates et al. | |
| 6,751,789 B1 | 6/2004 | Berry et al. | |
| 6,772,346 B1 * | 8/2004 | Chess et al. | 716/13 |
| 6,842,861 B1 * | 1/2005 | Cox et al. | 713/188 |
| 6,886,099 B1 | 4/2005 | Smithson et al. | |
| 6,928,555 B1 * | 8/2005 | Drew | 726/24 |
| 6,944,555 B2 | 9/2005 | Blackett et al. | |
| 6,952,779 B1 | 10/2005 | Cohen et al. | |
| 6,973,578 B1 | 12/2005 | McIchionc | |
| 7,024,403 B2 | 4/2006 | Kyler | |
| 2002/0035693 A1 | 3/2002 | Eyres et al. | |
| 2002/0038308 A1 | 3/2002 | Cappi | |
| 2002/0046207 A1 | 4/2002 | Chino et al. | |
| 2002/0073046 A1 | 6/2002 | David | |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023875 A1 | 1/2003 | Hursey et al. | |
| 2003/0033587 A1 | 2/2003 | Ferguson et al. | |
| 2003/0061287 A1 | 3/2003 | Yu et al. | |
| 2003/0065926 A1 | 4/2003 | Schultz et al. | |
| 2003/0110280 A1 | 6/2003 | Brock et al. | |
| 2003/0110393 A1 | 6/2003 | Presotto et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0154394 A1 | 8/2003 | Levin | |
| 2003/0167402 A1 | 9/2003 | Stolfo et al. | |
| 2003/0233352 A1 | 12/2003 | Baker | |
| 2004/0015554 A1 | 1/2004 | Wilson | |
| 2004/0039921 A1 | 2/2004 | Chuang | |
| 2004/0103310 A1 | 5/2004 | Sobel et al. | |
| 2004/0117401 A1 | 6/2004 | Miyata et al. | |
| 2004/0117641 A1 | 6/2004 | Kennedy et al. | |
| 2004/0220975 A1 | 11/2004 | Carpentier et al. | |

FOREIGN PATENT DOCUMENTS

| | | | |
|---|---|---|---|
| EP | | 1408393 A2 | 4/2004 |
| WO | | WO 99/15966 A1 | 4/1999 |
| WO | | WO 02/33525 A2 | 4/2002 |

OTHER PUBLICATIONS

Wikipedia.org web pages [online], Wikipedia, [retrieved Mar. 17, 2003] Retrieved from the Internet: <ULR: http://www.wikipedia.org/w/wiki.phintl?title=machine learning and printable=yes>. U.S.A.

"Enterprise Protection Strategy" [online] Trend Micro Inc. [retrieved Dec. 3, 2002] Retrieved from the Internet: <URL: http://www.trendmicro.com/en/products/eps/features.htm>. Tokyo, Japan.

"How to Test Outbreak Commander", :Trend Micro Inc., Aug. 2002, pp. 1-13, Cupertino, CA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>. U.S.A.

Bontchev, Vesselin, "Possible Macro Virus Attacks and How to Prevent Them", Computers & Security, vol. 15, No. 7, pp. 595-626, 1996, Reykjavik, Iceland.

Burchell J., "Netshield 1.5", Virus Bulletin LTD., Aylesbury, GB, Aug. 1, 1994, pp. 21-23, XP000617453, ISSN: 0956-9979.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

* cited by examiner

SELECTIVE DETECTION OF MALICIOUS COMPUTER CODE

TECHNICAL FIELD

This invention relates generally to detecting the presence of malicious code in computer files, and more particularly to improving the performance of malicious code detection methods.

BACKGROUND ART

During the brief history of computers, system administrators and users have been plagued by attacking agents such as viruses, worms, and Trojan Horses, which may be designed to disable host computer systems and propagate themselves to connected systems.

In recent years, two developments have increased the threat posed by these attacking agents. Firstly, increased dependence on computers to perform mission critical business tasks has increased the economic cost associated with system downtime. Secondly, increased interconnectivity among computers has made it possible for attacking agents to spread to a large number of systems in a matter of hours.

Attacking agents can infect a system by replacing the executable code stored in existing files. When the system attempts to execute the code stored in these files, it instead executes malicious code inserted by the attacking agent, allowing the attacking agent to gain control of the system. Virus scanning utilities, such as Norton Antivirus, produced by Symantec Corporation of Cupertino, Calif., allow a user to determine whether a file containing executable code has been infected with malicious code.

Traditionally, these utilities have been able to detect viruses by checking for suspicious sections of code in designated locations or looking for other easily detectable characteristics. These methods can be performed quickly, with little burden to system resources.

However, as attacking agents have become more sophisticated, scanning utilities have needed to perform even more complicated tests to detect the presence of malicious code. For example, special purpose code may have to examine large portions of a file or perform complicated emulation techniques to detect the presence of viruses.

These techniques must often be performed serially, and are extremely time and resource intensive. Optimizing these routines sufficiently to prevent them from becoming prohibitively time consuming when applied to a large number of files is becoming extremely difficult as attacking agents grow in number and complexity. What is needed is a way to improve the speed and reliability of detection techniques.

DISCLOSURE OF INVENTION

The present invention comprises methods, systems, and computer readable media for determining whether a computer file (340) has been infected by an attacking agent. A scanning engine (205) generates a new hash of a critical viral target region of the file (340) and compares it to a stored hash of the critical viral target region. The scanning engine (205) determines whether the file (340) has been scanned by the most recent version of a detection module (425) associated with the attacking agent. If the hashes are identical and the file (340) has been scanned by the most recent version of the detection module (425), the scanning engine (205) determines that the file (340) is free of infection by the attacking agent.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The present invention provides for determining whether a file 340 contains malicious code by checking a hash of a critical viral target region (CVTR).

As used herein, a CVTR refers to a region of a file 340 that is usually changed when the file 340 is infected with malicious code. CVTRs may be specific to a file 340 and can include the executable file header, the region around a main program entry point, the relocation section of the file 340, or any section of the file 340 that would likely be modified by an attacking agent. A file may include multiple CVTRs, each associated with particular attacking agents.

As used herein, the term "malicious code" refers to any program, module, or piece of code that enters a computer without an authorized user's knowledge and/or against an authorized user's wishes. The term "attacking agent" includes Trojan Horse programs, worms, viruses, and other such insidious software that insert malicious code into a file 340. An attacking agent may include the ability to replicate itself and compromise other computer systems. As used, herein the terms "infected" and "infection" refer to the process of inserting malicious code in a file.

As used herein, a "hash" or "hash function" is a one-way function, from a variable sized input to a fixed size output that is substantially collision free. Normally, the output is smaller than the input. "One-way" means that it is easy to compute the output from the input, but computationally infeasible to compute the input from the output. "Substantially collision free" means that it is very difficult to find two or more inputs that hash to the same output. Examples of suitable hash functions usable in the present invention are MD5 and a CRC (Cyclic Redundancy Check) function.

Figure 1:
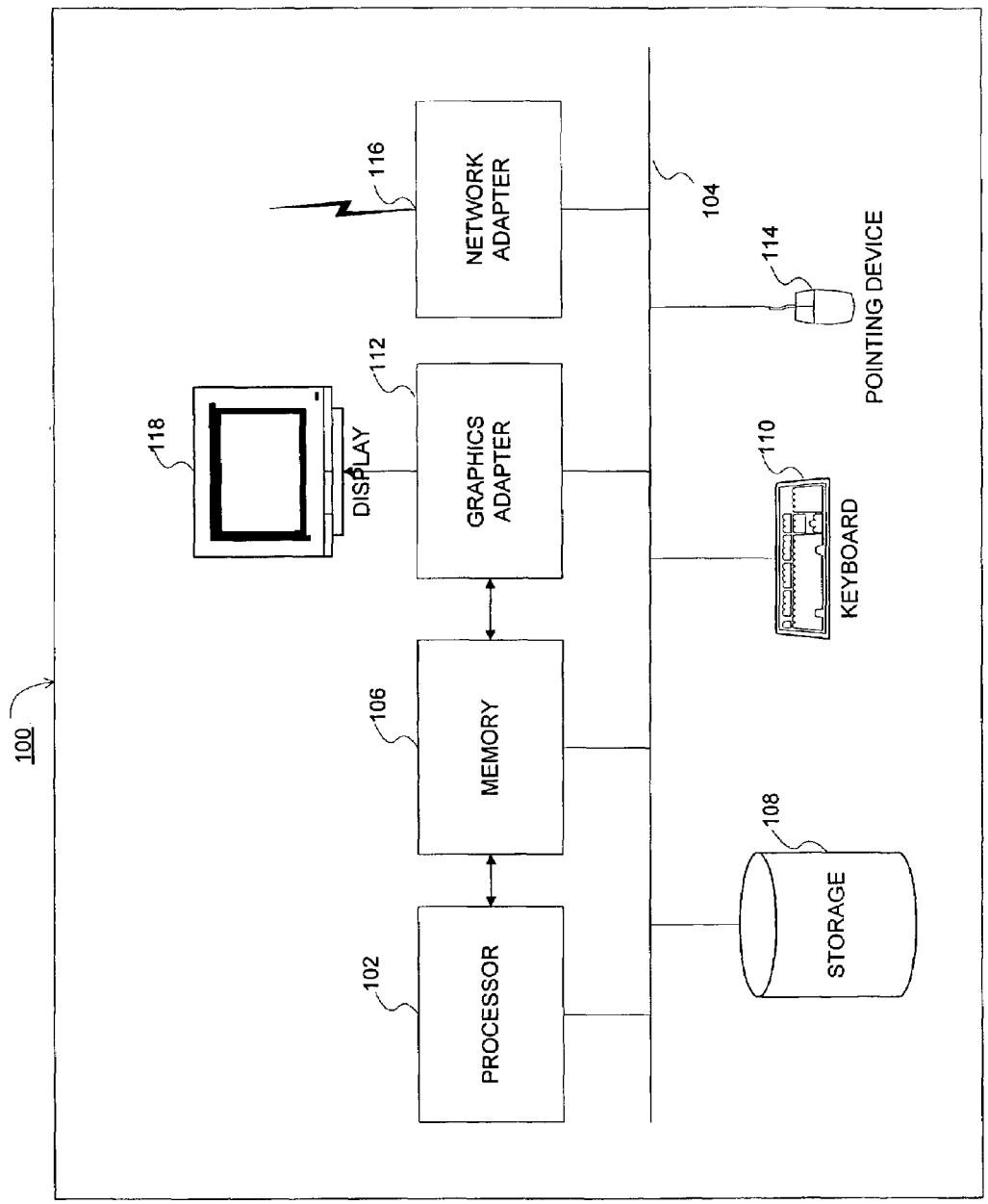
FIG. 1 is a high level block diagram illustrating a computer system 100 on which malicious code may be detected.

FIG. 1 is a high level block diagram illustrating a computer system 100 on which malicious code may be detected. Illustrated are a processor 102 coupled to a bus 104. There may be more than one processor 102. Also coupled to the bus 104 are a memory 106, a storage device 108, a keyboard 110, a graphics adapter 112, a pointing device 114, and a network adapter 116. A display 118 is coupled to the graphics adapter 112.

The processor 102 may be any specific or general-purpose processor such as an INTEL x86 or POWERPC-compatible central processing unit (CPU). The storage device 108 may be any device capable of holding large amounts of data, such as a hard drive, compact disk read-only memory (CD-ROM), DVD, or some other form of fixed or removable storage device.

The memory 106 holds instructions and data used by the processor 102. The pointing device 114 may be a mouse, touch-sensitive display, or other type of pointing device and is used in combination with the keyboard 110 to input data into the computer system 100. The types of hardware and software within the computer system 100 may vary.

Figure 2:
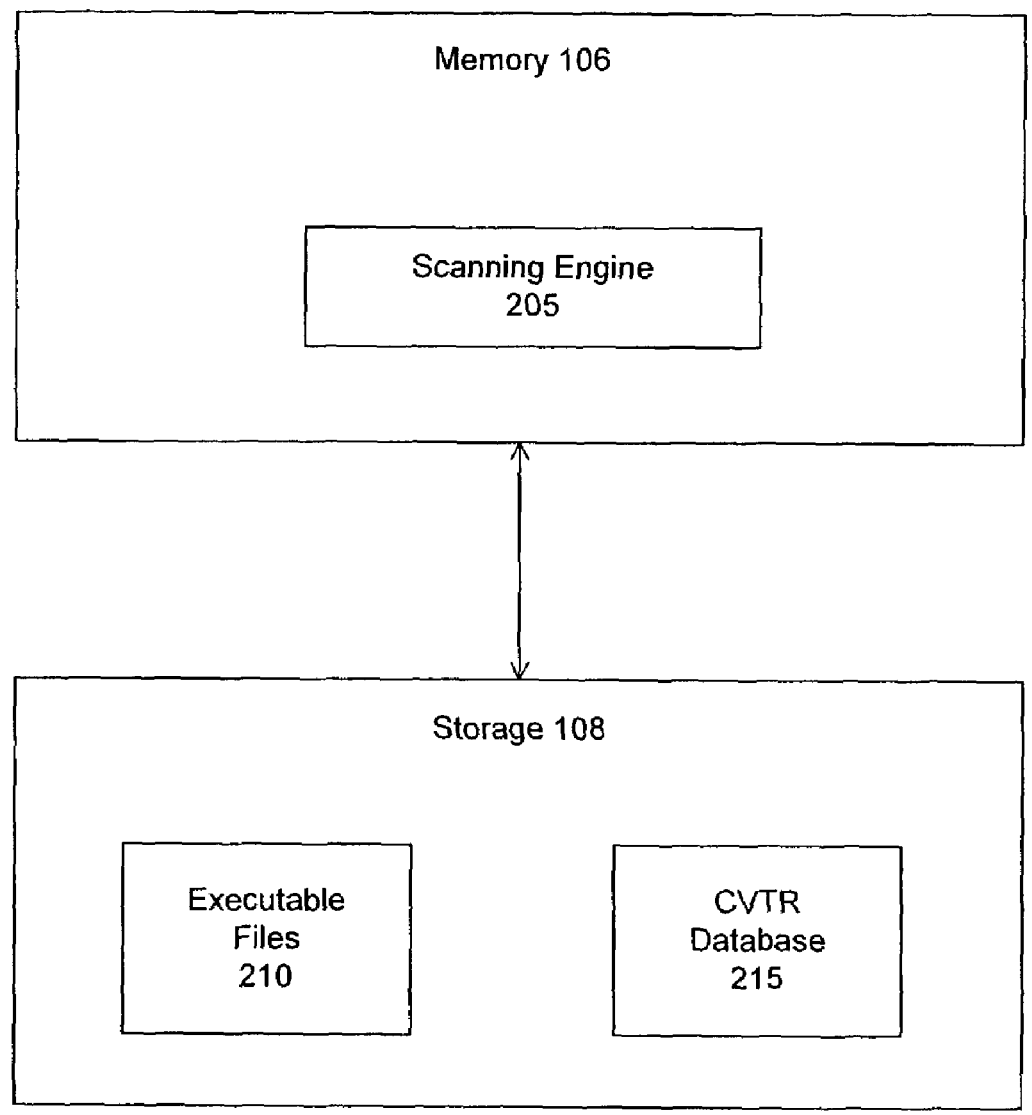
FIG. 2 is a block diagram illustrating a closer view of the memory 106 and the storage 108 of the computer system 100 of FIG. 1.

FIG. 2 is a block diagram illustrating a closer view of the memory 106 and storage 108 of the computer system 100 of FIG. 1. The memory 106 includes a scanning engine 205 that detects the presence of malicious code in the computer system 100.

The scanning engine 205 comprises group of modules that are stored on the storage 108 and loaded into memory 106. As used herein, the term "module" refers to computer program logic and/or any hardware or circuitry utilized to provide the functionality attributed to the module. A module may be implemented in hardware, software, firmware, or any combination thereof.

The scanning engine 205 identifies data to be checked for the presence of attacking agents, checks for the attacking agents, and, if necessary, responds to a detected attacking agent. Typically, the data to be checked reside in the storage device 108, the memory 106, or both. The scanning engine 205, therefore, identifies particular files 210 and/or memory locations to be checked for attacking agents. Other data that may be identified by the scanning engine 205 include emails received or sent by the computer system 100, streaming data received from the Internet, etc. The scanning engine 205 includes a version identifier which is updated whenever a new version of the scanning engine 205 is installed.

The storage 108 includes executable files 210 and a CVTR database 215. The executable files 210 are files containing executable code that are executed by the computer system 100 to perform various computational tasks. The CVTR database 215 contains scanning information related to each of the executable files 210. The CVTR database 215 preferably stores a CVTR region 310 of each of the executable files 210, a file identifier 305, and identifiers 320 indicating the most recent version of the scanning engine 205 applied to the file 340.

Figure 3:
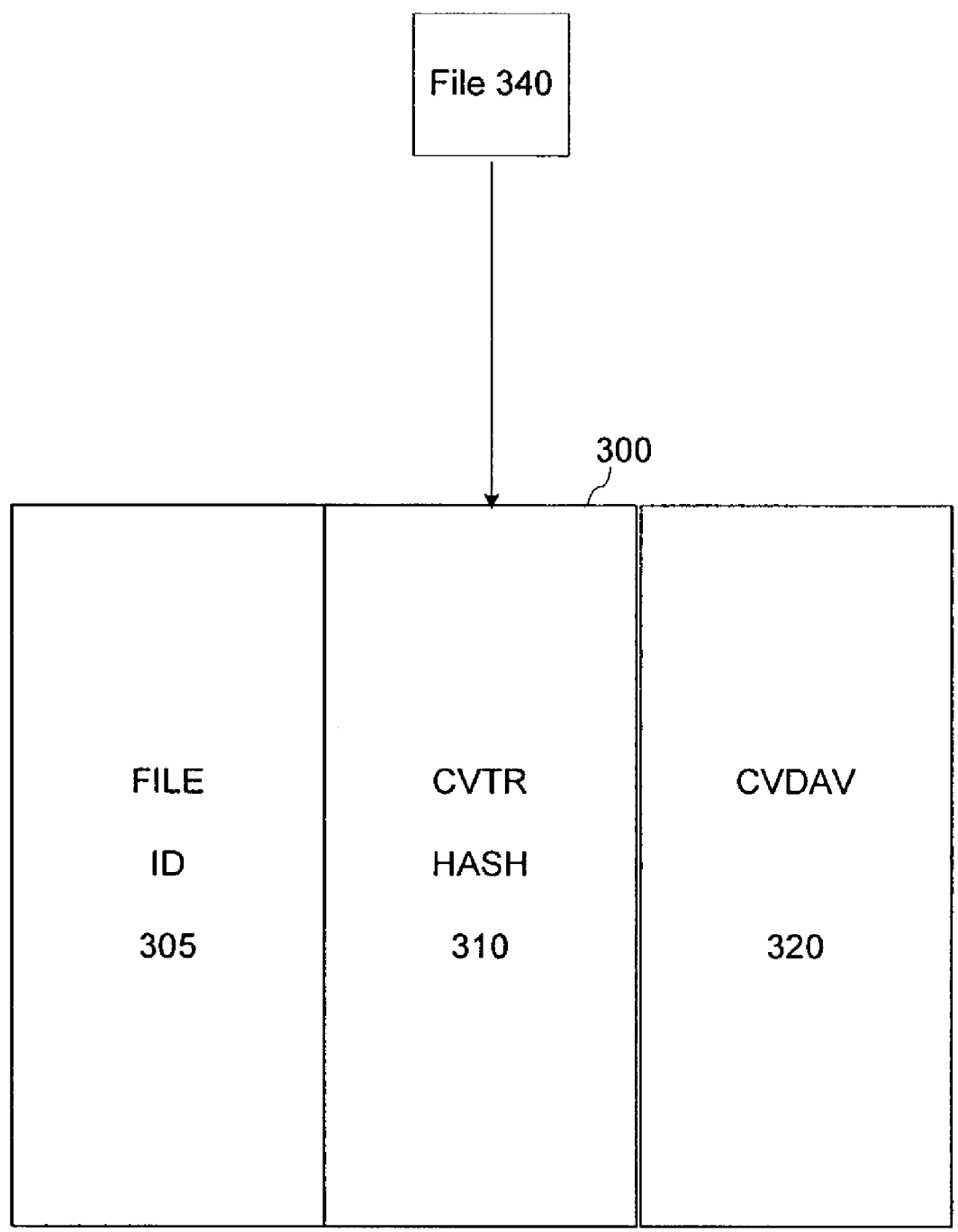
FIG. 3 is a block diagram illustrating an entry 300 in a scanning history database 215.

FIG. 3 is a block diagram illustrating an entry 300 in a CVTR database 215. Each entry 300 stores information about a file 340. The entry 300 includes a file identifier 305, which uniquely identifies the file 340 for the scanning engine 205. The file identifier 305 can be the file name or can be a hash of a unique portion of the file 340. Using a hash as an identifier allows the scanning engine 205 to identify files 210 even if the name of the file 340 has been changed, maliciously or otherwise.

The entry 300 additionally includes a section 310 storing hashes of one or more CVTR regions of the file 340. These hashes are generated when the scanning engine 205 performs a complex scan of the file 340. The section 310 may include a hash of a single CVTR which is used in the detection of all attacking agents. Alternatively the section 310 may store hashes of multiple CVTRs, with each CVTR associated with one or more attacking agents. Detected changes in a CVTR, such as an increase to a size field are indicative of possible infection by an attacking agent, but may not be useful as an indicator of a specific attacking agent. However, the absence of change to any CVTR is a reliable indicator that an attacking agent has not inserted malicious code in the file 340.

Each entry 300 also includes a complex virus detection algorithm version (CVDAV) 320 section. Each CVDAV section 320 stores the version of the scanning engine 205 last used to scan the file 340. When a newer version of the scanning engine 205 performs a scan of the file 340 for any attacking agent, the CVDAV section 320 is updated.

Figure 4:
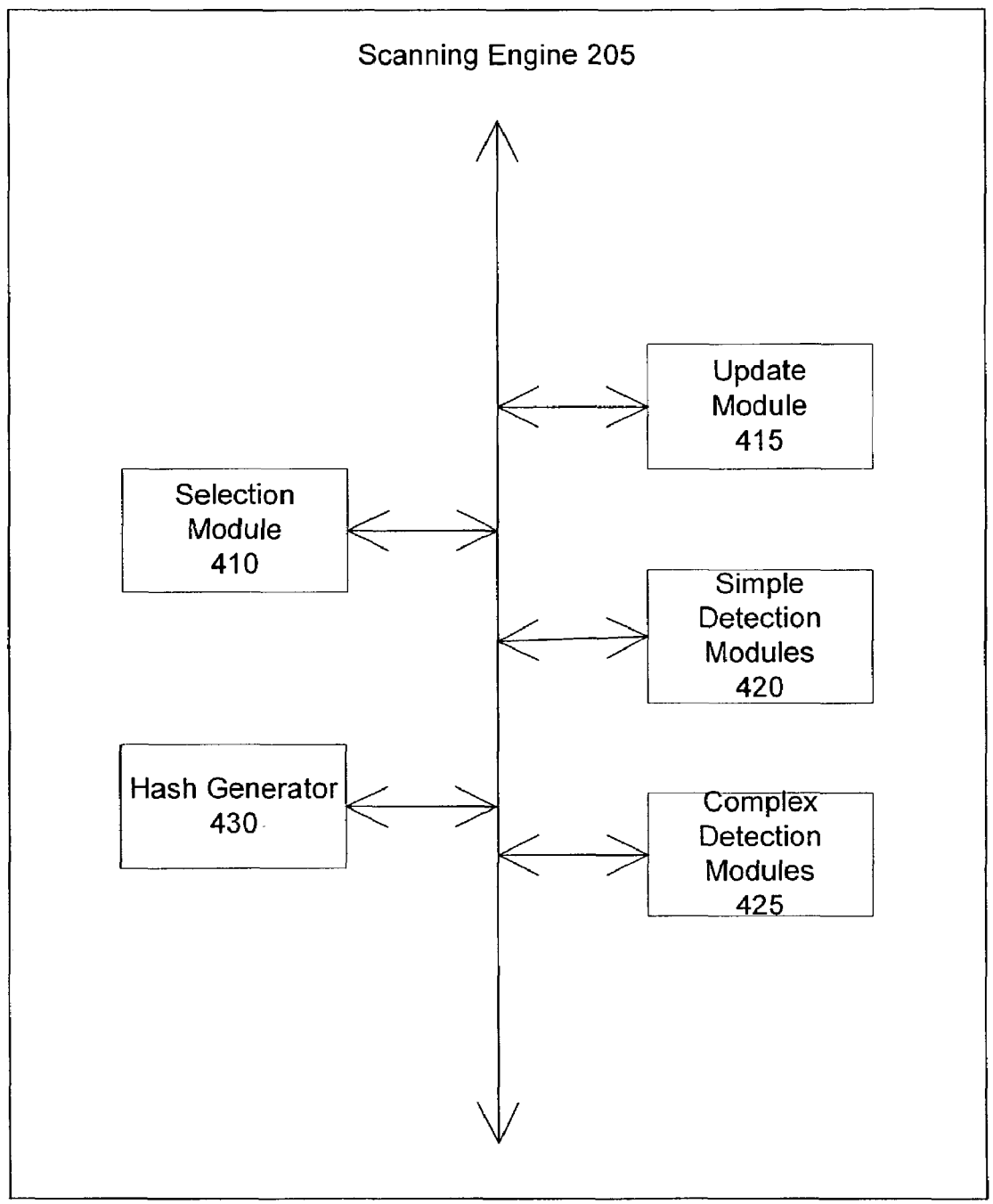
FIG. 4 is a block diagram illustrating a closer view of a scanning engine 205.

FIG. 4 is a block diagram illustrating a closer view of a scanning engine 205. The scanning engine 205 includes a selection module 410. The selection module 410 determines which tests to apply to the executable files 210. The selection module 410 is configured to evaluate a database entry 300 for the file 340 and determine which simple detection modules 420 and complex detection modules 425 to apply to the file 340.

A hash generator 430 is configured to generate a hash of a CVTR region of a file 340. The generated hashes are compared with the previously generated hashes 310 stored in the CVTR database 215 to determine whether the file 340 has changed.

The scanning engine 205 includes a group of simple detection modules 420. These detection modules 420 typically check selected areas of a file 340 for distinct code sequences or other signature information. Alternately, the modules 420 may check the file 340 for distinctive characteristics such as a particular size. Each of the simple detection modules 420 is associated with a particular attacking agent. The scanning engine 205 typically applies multiple simple detection modules 420 in parallel.

The scanning engine 205 additionally includes a set of complex detection modules 425. These detection modules 425 are configured to perform more advanced tests on a file 340 to determine whether malicious code is present. For example, a complex detection module 425 is useful for detecting the presence of a polymorphic encrypted virus. A polymorphic encrypted virus ("polymorphic virus") includes a decryption routine and an encrypted viral body. To avoid standard detection techniques, polymorphic viruses use decryption routines that are functionally the same for each infected file 340, but have different sequences of instructions. Thus, the scanning engine 205 cannot detect a polymorphic virus by applying one of the simple detection modules 420. Instead, the scanning engine 205 uses a complex detection module 425 that loads the executable file 340 into a software-based CPU emulator acting as a simulated virtual computer. The file 340 is allowed to execute freely within this virtual computer. If the executable file 340 does contain a polymorphic virus, the decryption routine is allowed to decrypt the viral body. The detection module 425 detects the virus by searching through the virtual memory of the virtual computer for a signature from the decrypted viral body. The complex detection modules 425 may also be configured to detect metamorphic viruses, that, while not necessarily encrypted, also vary the instructions stored in the viral body, or any other type of attacking agent that cannot be detected through simple signature based detection.

Typically, each of the complex detection modules 425 is associated with a particular attacking agent and is equipped to detect its presence, though in alternate embodiments multiple detection modules 425 may be associated with a single attacking agent, or a single detection module 425 may be equipped to detect multiple attacking agents.

Each of the complex detection modules 425 includes a version number indicating the last version of the scanning engine 205 to contain an updated version of the detection module 425. When a new version of the scanning engine 205 is installed, the newer versions of those detection modules 425 that are updated contain the version identifier of the newly installed version of the scanning engine 205. This information allows the scanning engine 205 to determine whether a file 340 has been checked with a newest version of a detection module 425. The scanning engine 205 checks the CVDAV entry 320 associated with a file 340 to determine the last version of the scanning engine 205 applied to the file 340.

Figure 5:
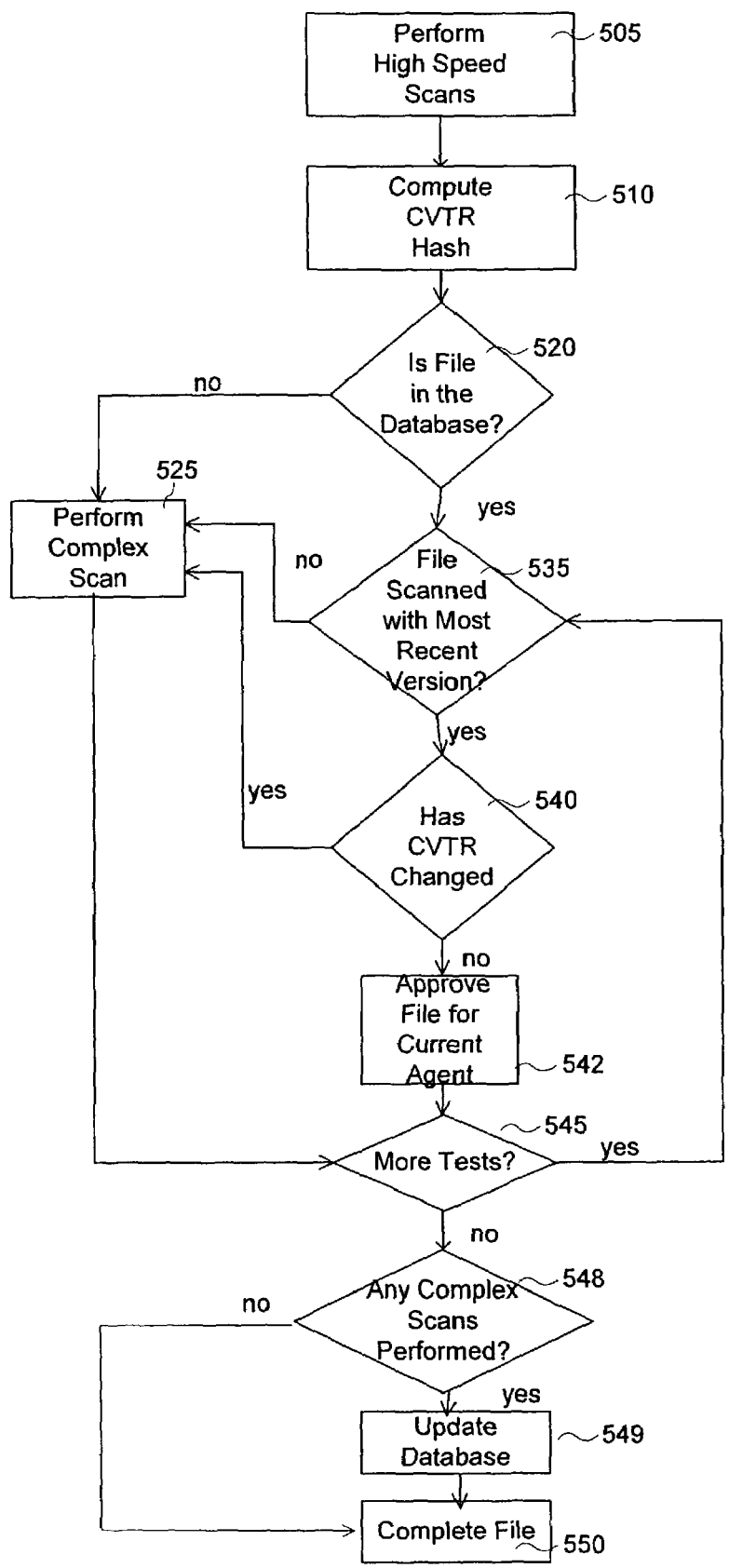
FIG. 5 is a flow chart illustrating a preferred embodiment of the present invention.

FIG. 5 is a flow chart illustrating a preferred embodiment of the present invention. The process begins with the scanning engine 205 applying 505 the simple detection modules 420 to the file 340 to be scanned. Typically, this process is performed until all of the simple detection modules 420 have been applied to the file 340. The hash generator 430 then reads the file 340 and computes 510 a hash of the critical viral target region of the file 340.

The selection module 410 then determines 520 whether the CVTR database 215 includes an entry 300 for the current file 340. If the file 340 is not in the database 215, the selection module 410 applies 525 a complex detection module 425 to the file 340.

If the file 340 appears in the database 215, the selection module 410 determines 535 whether the file 340 has been scanned by the newest version of the detection module 425 by checking the CVDAV section 320 of the entry 300 corresponding to the file 340 in the CVTR database 215 to determine the version of the scanning engine 205 that was last applied to the file 340. The selection module 410 then checks the version number of the current complex detection module 425 to determine the last version of the scanning engine 205 to contain an update to the detection module 425. If the version number of the scanning engine 205 last applied to the file 340 is equal or higher than the version number of the most recent version of the scanning engine 205 to contain an update to the detection module 425, the scanning engine 205 determines that the file 340 has been scanned with the most recent version of the current detection module 425.

If the selection module 410 determines that the file 340 has not been scanned by the most recent version of the detection module 425, the scanning engine 205 applies 525 the newest complex detection module 425 to the file 340.

If the CVDAV section 320 indicates that the file 340 was scanned with the current detection module, the selection module 410 determines 540 whether the CVTR has changed by comparing the newly generated CVTR hash to the hash 310 stored in the CVTR database 215. If the selection module 410 determines that the CTVR has changed, the scanning engine 205 applies the complex detection module 425 to the file 340. If the selection module 410 determines that the CVTR has not changed, the selection module 410 approves 542 the file as not infected by the current attacking agent. The process is repeated 545 for each complex detection module 425, until the file 340 has been tested for every attacking agent known to the scanning engine 205.

If a complex scan is performed 525 on the file 340 for any attacking agent, the update module 415 updates 548 the CVTR database 215 to reflect any changes. The update module 415 stores the recently generated CVTR hash in the hash field 310 and stores the current version number of the scanning engine 205 in the CVDAV field 320. If no entry previously existed for the file 340, the update module 415 creates a new entry 300, stores the recently generated CVTR hash in the hash field 310 and stores the version number of the current scanning engine 205 in the CVDAV field 320. The scanning engine 205 then stops 550 scanning the file 340.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for detecting infection of a computer file by an attacking agent, the method comprising the steps of:
   generating and storing a new hash of a critical viral target region of the computer file, wherein the critical viral target region comprises a region of the file that is changed when the file is infected;
   comparing the new hash of the critical viral target region to a hash of the critical viral target region previously generated based on an earlier version of the computer file;
   determining whether the computer file has been scanned for infection by the attacking agent with a most recent version of a detection module; and
   determining that the computer file has not been infected by the attacking agent when the new hash and the previously generated hash are identical, and the computer file has been scanned with the most recent version of the detection module.

2. The method of claim 1, further comprising the step of applying the detection module to the computer file in response to a determination that the new hash and the previously generated hash are identical and a determination that the computer file has not been scanned by the most recent version of the detection module.

3. The method of claim 2, further comprising the step of updating an indicator of a most recent version of a scanning engine applied to the computer file to indicate a current version of the scanning engine.

4. The method of claim 1, wherein the step of determining whether the computer file has been scanned for infection by the attacking agent with a most recent version of the detection module comprises the sub-steps of:
   determining a most recent version of a scanning engine applied to the computer file;
   determining a most recent version of the scanning engine to include an updated version of the detection module; and
   determining that the computer file has been scanned with the most recent version of the detection module when the most recent version of the scanning engine applied to the computer file was not created earlier than the most recent version of the scanning engine to include an updated version of the detection module.

5. The method of claim 1, further comprising the step of applying the detection module to the computer file in response to a determination that the new hash and the previously generated hash are not identical.

6. The method of claim 5, further comprising the step of replacing the previously generated hash of the critical viral target region with the new hash of the critical viral target region.

7. The method of claim 1, wherein the critical viral target region includes an executable file header in the computer file.

8. The method of claim 1, wherein the critical viral target region includes a start of a relocation section in the computer file.

9. The method of claim 1, wherein the critical viral target region includes a region around a program entry point in the computer file.

10. A computer system for detecting infection of a computer file by an attacking agent, the system comprising:
    a detection module configured to check the computer file for infection by the attacking agent, the detection module including an identifier of a most recent version of a scanning engine to include an update to the detection module;

a database, in communication with the detection module, and storing entries, each entry associated with a file and containing a hash of a critical viral target region previously generated based on an earlier version of the computer file, wherein the critical viral target region comprises a region of the file that is changed when the file is infected and an identifier indicating a most recent version of the scanning engine to scan the file for the presence of malicious code;

a hash generator, in communication with the database, and configured to generate a new hash of the critical viral target region;

a selection module, in communication with the database and the hash generator, and configured to:

compare the new hash of the critical viral target region to the previously generated hash of the critical viral target region;

compare the identifier of the most recent version of the scanning engine to scan the file to the identifier of the most recent version of the scanning engine to include an update of the detection module; and determine that the file has not been infected by an attacking agent when the new hash and the previously generated hash are identical, and the most recent version of the scanning engine to scan the file is not an earlier version than the most recent version of the scanning engine to include an update of the detection module.

11. The system of claim 10, wherein the selection module is further configured to:

apply the detection module to the file in response to a determination that the new hash and the previously generated hash are identical and a determination that the most recent version of the scanning engine to scan the file is an earlier version than the most recent version of the scanning engine to include an update of the detection module.

12. The system of claim 11, further comprising an update module, in communication with the database and with the selection module, and configured to update the identifier of the most recent version of the scanning engine to scan the file to indicate that the most recent version of the scanning engine to scan the file is the current version of the scanning engine.

13. The system of claim 10, wherein the selection module is further configured to apply a detection module to the file in response to a determination that the new hash and the previously generated hash are not identical.

14. The system of claim 13, wherein the update module is further configured to update the database to store the new hash of the critical viral target region.

15. A computer-readable storage medium containing executable computer code instructions for detecting infection of a file by an attacking agent, the computer code comprising instructions for:

generating and storing a new hash of a critical viral target region of the file, wherein the critical viral target region comprises a region of the file that is changed when the file is infected;

comparing the new hash of the critical viral target region to a hash of the critical viral target region previously generated based on an earlier version of the computer file;

determining whether the file has been scanned for infection by the attacking agent with a most recent version of a detection module; and determining that the file has not been infected by the attacking agent when the new hash and the previously generated hash are identical, and the file has been scanned with the most recent version of the detection module.

16. The computer readable medium of claim 15, wherein the instructions for detecting infection of the file by an attacking agent further comprise instructions for applying the detection module to the file in response to a determination that the new hash and the previously generated hash are identical and a determination that the file has not been scanned by the most recent version of the detection module.

17. The computer readable medium of claim 16, wherein the instructions for detecting infection of the file by an attacking agent further comprise instructions for updating an indicator of a most recent version of a scanning engine applied to the file to indicate a current version of the scanning engine.

18. The computer readable medium of claim 15, wherein the instructions for detecting infection of the file by an attacking agent further comprise instructions for applying the detection module to the file in response to a determination that the new hash and the previously generated hash are not identical.

19. The computer readable medium of claim 18, wherein the instructions for detecting infection of the file by an attacking agent further comprise instructions for replacing the previously generated hash of the critical viral target region with the new hash of the critical viral target region.

20. The method of claim 1, wherein the critical viral target region comprises a region of the file that is less than the entire file.

* * * * *